Figure 1:
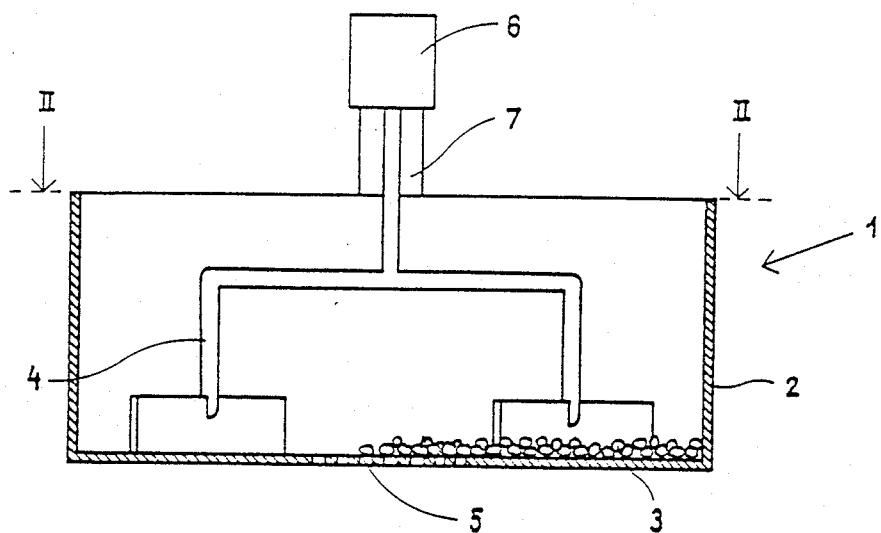

United States Patent [19]

Lip et al.

[11] Patent Number: 4,909,448

[45] Date of Patent: Mar. 20, 1990

[54] METHOD OF GRANULATING LIME POWDER OR THE LIKE

[75] Inventors: Peter Lip; Ejnar Lip, both of Nørre Aaby, Denmark

[73] Assignee: F. L. Smidth & Co. A/S, Denmark

[21] Appl. No.: 269,536

[22] PCT Filed: Feb. 26, 1988

[86] PCT No.: PCT/DK88/00038

§ 371 Date: Dec. 27, 1988

§ 102(e) Date: Dec. 27, 1988

[87] PCT Pub. No.: WO88/06486

PCT Pub. Date: Sep. 7, 1988

[30] Foreign Application Priority Data

Feb. 27, 1987 [DK] Denmark .............................. 1026/87

[51] Int. Cl.⁴ .................... B02C 17/10; B02C 17/16
[52] U.S. Cl. ...................................... 241/21; 241/69; 241/84; 241/173
[58] Field of Search ................. 23/313; 241/20, 24, 241/172, 173, 21, 84, 69; 264/117

[56] References Cited

U.S. PATENT DOCUMENTS

| | | | |
|---|---|---|---|
| 3,329,348 | 7/1967 | Pootmans | 241/172 X |
| 3,591,362 | 7/1971 | Benjamine | 241/172 X |
| 3,612,419 | 10/1971 | Szequari | 241/172 |
| 4,249,903 | 2/1981 | Smolka et al. | 23/313 R X |
| 4,811,909 | 3/1989 | Inoki | 241/172 X |

*Primary Examiner*—Timothy V. Eley
*Attorney, Agent, or Firm*—Brumbauch, Graves, Donohue & Raymond

[57] ABSTRACT

A method of granulating lime powder or the like, use being made of a counterflow mixing machine with scraping and mixing means. The mixing means are rotated about a substantially vertical axis, and the bottom of the mixing vessel is covered with a layer of substantially ball shaped bodies, and raw material, e.g. lime, is subsequently added in a suitable amount having a specified moisture content, the mixing means subsequently being rotated such that the raw material after a specified period of time dependent on its moisture content, sticks to the ball shaped bodies. The mixing means are subsequently further rotated for a period of time, also dependent on the actual moisture content, to the effect that the material collected on the said ball shaped bodies consequently is peeled off and settles on the bottom of the mixing vessel, the material being subjected to a final granulation in that the scraping and mixing means adapted for that purpose convey the material to a discharge grate situated at the bottom of the vessel.

16 Claims, 1 Drawing Sheet

METHOD OF GRANULATING LIME POWDER OR THE LIKE

The invention concerns a method of granulating material, such as lime powder or the like, use being made of a counterflow mixing machine with scraping and mixing means, which is rotated about a vertical axis.

Methods of granulating are known in which either rotary discs or a screw conveyor system (an edge mill-principle) are used. These known methods have several drawbacks. Thus, the rotary disc principle usually entails expensive plants, and furthermore the granulating method is inexpedient as the granulates proper obtain a somewhat layered structure making their shape unstable. Consequently, the granulates tend to break or disintegrate.

In particular, it is the inclined position of the disc which makes the manufacture of a rotary disc expensive, the inclined position causing an asymmetric distribution of the goods around the axis of rotation, which calls for large and strong bearings and shafts to absorb the heavy forces.

According to the edge mill principle the raw material is subjected to moistening in a screw conveyor, grinding in a moistening edge mill, and typically passes through a vibrating screen or, via a so-called "mincing machine"-principle, through a plate with holes adapted for that purpose, whereby the kneaded material is discharged in a number of lengths and is chopped into suitable pieces. This manufacturing process also entails rather heavy costs, and additionally it necessitates extensive pre-and aftertreatment of the raw material in view of the requisite moistening and kneading prior to chopping off, the chopped off material parts subsequently having to be subjected to a certain drying. By this manufacturing procedure are obtained granulates of non-ball shaped nature, which is inexpedient when exposing the granulates to load, e.g. by storage or transportation, which easily entails a certain waste of material.

Furthermore, it is also impossible to produce small granulates of e.g. 2 mm, as the minimum size lies within the range 8-10 mm. A machine operating according to the edge mill principle is also very expensive to make, as the rollers of the edge mill have to be very heavy and the plate with holes through which the goods is pressed must have a very sturdy construction, e.g. a thickness of 50-100 mm. Additionally, the boring proper of the many holes in the thick plate is extremely work-consuming.

It is a common feature of both methods of granulating that their capacity is rather low, which of course adds to the cost of the finished product.

Use of stones in a rotating mixing vessel is known in connection with the so-called ball mills; however, their object being, as opposed to the object of the present invention, being the to obtain comminution of materials.

It is the object of the present invention in connection with granulation of particle shaped material, such as lime and the like, to devise a method adapted for that purpose, which in combination with simple plant facilities makes possible the manufacture of a stable granulate and additionally involves negligent waste, simultaneously with the operating and initial costs involved being low.

The object is achieved by a method of granulation, as stated in the characterizing portion of claim 1. The counterflow mixer used has, as opposed to the said ball mills, a vertical axis of rotation essentially causing the "mixing stones" constantly to collect at the vessel bottom in stead of being whirled about in the vessel as is the case in the ball mill process, the result here being comminution.

However, by the method according to the invention it is obtained in stead that the raw material (lime, clay and the like) sticks to the stones because of its natural or added moisture content. After a while the material layer thus built by rotary mixing will be dehydrated/dried, essentially thereby instantly stopping adhesion to the mixing stones, and the material peels off. The material collects at the bottom and is scraped out as a finished granulate through a grate situated in the vessel bottom.

It is evident that the granulation process may comprise addtion of both moisture, dry matter and possible binders to achieve granulates with various properties.

Figure 2:
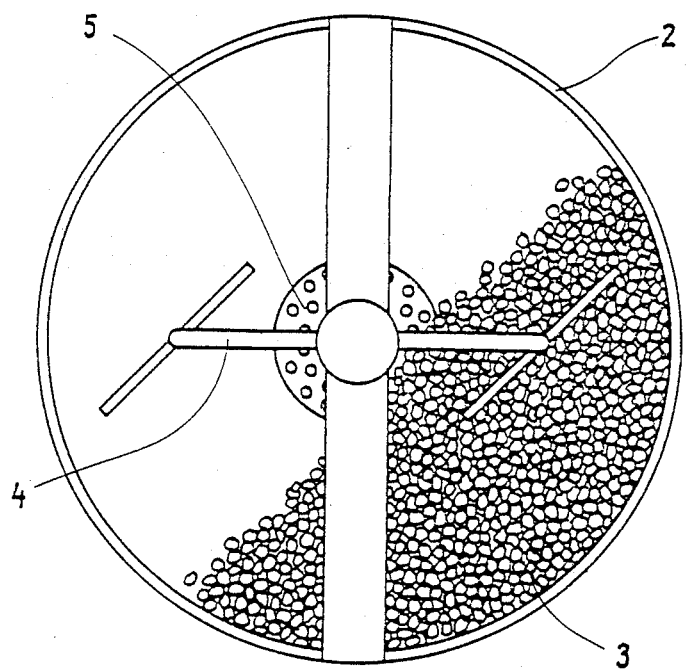

The invention will be explained more fully by the following description of a preferred embodiment, reference being made to the drawing, in which FIG. 1 is a vertical cross-section of the mixing and granulating vessel adapted for the method, and FIG. 2 is a sectional view of the mixing vessel taken along the line II—II in FIG. 1

FIG. 1 shows the mixing machine 1 with the vessel 2 which may be stationary or rotating. Its bottom has for the purpose been filled with a layer of stone or the like 3 (e.g. flint nodules). For the sake of clarity, the bottom of the vessel is shown only partly covered with stone. A motor 6 is provided for operating the machine, the motor being suspended from a cross member 7. The mixing machine may further be provided with a lid or a cover plate on which the motor will then be mounted. Thus, in use, raw material, e.g. lime, is added. To make the process work the raw material must have a certain moisture content, e.g. within the range 8-10%. If this moisture content is not present in the starting form the raw material may be moistened with atomized water, whereafter the process proper is initiated.

During rotation, a number of mixing arms 4 adapted for that purpose ensures correct co-operation and mixing of stone and raw material, the lime being dehydrated by this process. When the raw material, or the lime, has thus reached a specified consistency, it will almost instantly settle on the surface of the stones as a lime peel, and further rotation and dehydration cause these material deposits to "let go" in large pieces, also almost instantly. The material peels thus deposited collect at the vessel bottom, and by means of the mixing and scraping means 4 the material is conveyed to a grate 5 situated in the vessel to be subjected to a final granulation to a desired size and shape. When this takes place, a bottom plate (not shown) situated under the grate is opened, and the granulate is discharged continuously from the vessel.

It is understood that a certain interdependance between the rotational speed of the mixing vessel, the number of mixing arms and their rotational direction and speed as well as the air temperature in the mixing vessel will provide the specified and desired conditions for the product properties and sizes of the granulates.

As the vessel of the mixing machine may be stationary, it is not necessary, as is the case with the rotary disc, to suspend the mixing vessel from sturdy bearings, thus entailing no expenses. As balls and material are automatically distributed symmetrically around the axis of rotation of the mixing means as a result of the influence of the rotating mixing means, the impacts on the bearings of the mixing means are comparatively small. Even if the method according to the invention is used in a mixing machine with rotating, horizontally positioned vessels and rotating mixing means, the impacts on the bearings will still be smaller than in a corresponding rotary disc due to the even distribution of the balls.

As compared with granulation according to the edge mill principle the equipment used is also very cheap, as the heavy rollers of the edge mill have been replaced with many small balls, and as the need for a thick plate with holes is also avoided. Nor is any energy required for surpassing the friction when pressing out the material through the perforated bottom plate, as the passage of the granulates through the outlet grate essentially takes place voluntarily according to the method of the present invention.

Furthermore, the method makes it possible to produce small granulates of e.g. 1-2 mm, thereby avoiding the above disadvantage of the minimum body size of 8-10 mm in the edge mill.

Thus, by combining the present method with the known simple plant is obtained, in addition to the direct cost savings, a plant capable of yielding a larger product amount per time than previously. Furthermore, test have shown that more than 75% of the finished granulate have a substantially uniform, desired granulate size, the remaining 25% distributing themselves as 15% having a somewhat coarser size and finally 10% having a somewhat finer granulate size. Consequently, the method according to the invention has the effect that essentially no waste occurs during the granulate manufacture.

The following five different granulating experiments briefly illustrates this.

In a first experiment the method was used for granulating lime in a rotary mixer having a volume of 1500 l. The granulating bodies were 1200 kg flint nodules having a diameter of 65-85 mm. 600 kg lime were added and moistened during operation to reach a water percentage of 12. After a period of operation of approx. 6 min. the product was discharged, and the granulating result was that 85 % of the product had a desired granulate size of 1-2 mm, no granulates being smaller than ½ mm, and none larger than 4 mm.

The method has also been used in conection with so-called Greenland spar dust, and was also successful in the above machines, and the resulting granulate had a size of 1-3 mm. This granulating experiment was tested with the same favourable result with a mixing volume of 3000 l and a material amount of 1000 kg cryolite. Thus, it is possible to process a residual product into a granualte which is further treatment can be a valuable product.

In a tird experiment the method according to the invention was tested in connection with iron oxide dust which represents a possible environmental risk. However, by converting the product, in accordance with the method, into a dust-free 2-3 mm granulate it is possible to transport and use the iron oxide in an environmentally correct and safe way.

Finally, the method according to the invention has been tested in connection with so-called calcined dolomite dust having a grain size less than 0.03 mm. For this granulation the mixer, which had a volume of 500 l, was filled with 300 kg 60-80 mm oval pebbles, the product amount being approx. 160 kg. The granulating time was also here about 6 min., and the result was a granulate size of 0.5 mm—3 mm, while the water percent of the finished product was 11.5%. The experiment was also carried out with a water percentage of 6.6, and the granulate size here was 0.2-1.5 mm. In this experiment a pneumatic wear test was also made on the dried granulates, resulting in 9% and 12%, respectively, dust particles below 30 $\mu$m.

This result can be compared with a granulation of the same substance by a rotary disc, which resulted in a granulate size of 0.2-3 mm having a water content of 11.8%. In this case, however, the wear test showed that the amount of dust particles below 30 $\mu$m constituted 29% of the product.

It has also been tried to granulate dry filter dust having the lowest possible water content in the granulate, the only aim being to obtain a dust-free granulate. The granulation was carried out because of the content of quarts powder and other dangerous substances in the filter dust. After the granulation the granulates were to be mixed with wet raw clay and subsequently burnt; consequently, from an economical point of view, it was important to keep the water percentage as low as possible. The table below shows four separate tests with different water percentages, each test being carried out with a raw material amount of 160 kg.

| Test No. | | Water percentage | Granulate size (mm) |
| --- | --- | --- | --- |
| 1 | dust-free | 10 | 0.2–2 |
| 2 | — | 11.8 | 0.2–2 |
| 3 | — | 15 | 2–8 |
| 4 | — | 16.5 | 4–10 |

We claim:

1. A method of granulating powder raw material, in a counterflow mixing vessel with scraping means and mixing means rotatable about a vertical axis, said method including the steps of
    (a) providing a layer of substantially ball-shaped bodies on the bottom of the mixing vessel;
    (b) supplying the raw material to be granulated to the mixing vessel;
    (c) supplying moisture to the raw material;
    (d) rotating the mixing means about said axis so as to cause the moisture-containing raw material to stick to the ball-shaped bodies;
    (e) further rotating the mixing means so as to cause the moisture-containing material on the ball-shaped bodies to peel off and settle to the bottom of the mixing vessel; and
    (f) subjecting the material to further granulation by conveying, by means of the mixing means and scraping means, the material which has been peeled from the ball-shaped bodies to a grate located at the bottom of the vessel and discharging the material from the vessel through said grate.

2. A method according to claim 1, further including the step of supplying a binding agent to the material to be granulated.

3. A method according to claim 2 wherein said binding agent is at least one of the materials bentonite, lime hydrate, burnt clay, cement carboxymethylcellulose, tar substances, glue or peridur.

4. A method according to claim 1 wherein the ball-shaped bodies are made of at least one of the materials metal, ceramic, quartzite, densit or stone, and wherein the diameter of the bodies lies within the range 10 mm-200 mm.

5. A method according to claim 4 wherein the ball-shaped bodies are at least one of steel or aluminum.

6. A method according to claim 4 wherein the ball-shaped bodies are flint nodules.

7. A method according to claim 1 wherein moisture is supplied to the raw material so as to obtain a moisture content of the raw material within the range 5-50%.

8. A method according to claim 7 wherein moisture is supplied to the raw material so as to obtain a moisture content of the raw material within the range 5-15%.

9. A method according to claim 1 wherein the material is mixed in the mixing vessel for a period of from 2-60 minutes.

10. A method according to claim 9 wherein the material is mixed in the mixing vessel for a period of from 5-10 minutes.

11. A method according to claim 6 wherein the powder raw material contains at least one material selected from the group consisting of lime, Greenland spar dust, iron oxide, calcined dolomite, or filter dust.

12. A method according to claim 11 wherein the powder raw material contains lime.

13. A method according to claim 11 wherein the powder raw material contains Greenland spar dust.

14. A method according to claim 11 wherein the powder raw material contains iron oxide.

15. A method according to claim 11 wherein the powder raw material contains calcined dolomite.

16. A method according to claim 11 wherein the powder raw material contains filter dust.

* * * * *